United States Patent
Vidal et al.

(10) Patent No.: US 6,397,581 B1
(45) Date of Patent: Jun. 4, 2002

(54) HEAT EXCHANGER IN COMPOSITE MATERIAL AND METHOD FOR MAKING SAME

(75) Inventors: Jean-Pierre Vidal, St Aubin de Medoc; Jean-Michel Larrieu, Macau; Jean-Pierre Ciais, Blanquefort, all of (FR)

(73) Assignee: Societe Nationale d'Etude et de Construction de Moteurs d'Aviation—S.N.E.C.M.A., Paris (FR)

( * ) Notice: Subject to any disclaimer, the term of this patent is extended or adjusted under 35 U.S.C. 154(b) by 0 days.

(21) Appl. No.: 09/582,855

(22) PCT Filed: Nov. 5, 1999

(86) PCT No.: PCT/FR99/02708

§ 371 (c)(1),
(2), (4) Date: Aug. 17, 2000

(87) PCT Pub. No.: WO00/28202

PCT Pub. Date: May 18, 2000

(30) Foreign Application Priority Data

Nov. 5, 1998 (FR) .......................................... 98 13923

(51) Int. Cl.⁷ .............................................. F02K 11/00
(52) U.S. Cl. ..................... 60/267; 60/270.1; 228/262.9; 165/134.1; 165/135; 165/169; 428/408; 428/116
(58) Field of Search ............................. 165/80.4, 134.1, 165/135, 169; 428/608, 116, 118; 228/262.9; 60/270.1, 266, 267

(56) References Cited

U.S. PATENT DOCUMENTS

| | | | |
|---|---|---|---|
| 4,488,920 A | 12/1984 | Danis | |
| 4,838,031 A | 6/1989 | Cramer | |
| 5,174,368 A | 12/1992 | Boury et al. | |
| 5,352,529 A | 10/1994 | Scanlon et al. | |
| 5,583,895 A | 12/1996 | Filipuzzi et al. | |
| 6,182,442 B1 * | 2/2001 | Schmidt | ...................... 60/267 |

FOREIGN PATENT DOCUMENTS

| | | |
|---|---|---|
| EP | 0314261 | 5/1989 |
| GB | 2279734 | 1/1995 |

* cited by examiner

*Primary Examiner*—Charles G. Freay
*Assistant Examiner*—Ehud Gartenberg
(74) *Attorney, Agent, or Firm*—Weingarten, Schurgin, Gagnebin & Lebovici LLP

(57) ABSTRACT

The heat exchanger comprises an intermediate portion (14) of refractory composite material, e.g. of C/C composite material, in which fluid circulation channels (16) are formed, and which is interposed between a portion of refractory composite material, e.g. having a ceramic matrix, such as C/SiC composite material, forming a heat shield (12) and a portion of thermostructural composite material, e.g. C/C composite material, forming a heat exchanger support structure (18), the component portions of the heat exchanger being assembled together by brazing. The heat exchanger can be used as a wall element exposed to an intense heat flux, in particular in a nuclear fusion reactor or in a ram jet combustion chamber.

23 Claims, 2 Drawing Sheets

HEAT EXCHANGER IN COMPOSITE MATERIAL AND METHOD FOR MAKING SAME

FIELD OF THE INVENTION

The invention relates to heat exchangers which use heat exchange assemblies based on a circulating fluid and which are designed to be employed in a severe temperature environment.

Particular, but non-limiting, fields of application of the invention are systems for transforming materials, e.g. nuclear fusion reactors, and propulsion systems, in particular wall elements for the combustion chambers of jet engines, in particular ram jets.

BACKGROUND OF THE INVENTION

The heat exchangers used in such applications are generally made of metal, at least in part. Unfortunately, the thermal and mechanical properties of metals and metal alloys limit their field of use, and also their performance and safety. Furthermore, metal heat exchangers are heavy and bulky, which penalizes use thereof, at least in some applications.

It has been envisaged to use refractory composite materials alone or in combination with metals for making heat exchangers designed to be used in a severe temperature environment, in particular for the wall of a nuclear fusion reactor. Thus, patent application WO 98,/03297 describes making such a heat exchanger by brazing pieces of carbon-carbon (C/C) composite material on a metal (copper) substrate cooled by fluid circulation. That involves using a metal. Also known is U.S. Pat. No. 5,583,895 which describes a heat exchanger structure for the same application in the form of a C/C composite material block in which fluid circulation passages are formed. The walls of the passages are made leakproof by a metal lining, e.g. made of copper, which is brazed to the C/C composite material.

OBJECTS AND SUMMARY OF THE INVENTION

An object of the invention is to provide a heat exchanger capable of being used in a severe temperature environment.

Another object of the invention is to provide a heat exchanger in which the various thermal and structural functions can be optimized so that mass, bulk, and cost are reduced as far as possible.

Another object of the invention is to provide a heat exchanger capable of being made easily.

Another object of the invention is to provide a method of manufacturing such a heat exchanger.

A heat exchanger of the invention is characterized in that it comprises an intermediate portion of refractory composite material in which fluid circulation channels are formed, the intermediate portion being interposed between a portion of refractory composite material forming a heat shield and a portion of thermostructural composite material forming a support structure of the heat exchanger, the portions constituting the heat exchanger being assembled together by brazing.

A thermostructural composite material is a composite material having mechanical properties making it suitable for constituting structural elements and which conserves these properties up to high temperatures. Such thermostructural composite materials are typically composite materials having fiber reinforcement of refractory fibers such as carbon fibers or ceramic fibers, densified by a refractory matrix such as a carbon matrix or a ceramic matrix. Examples of thermostructural composite materials are carbon/carbon (C/C) composite materials with reinforcing fibers and a matrix made of carbon, and ceramic matrix composite (CMC) materials, e.g. having a matrix of silicon carbide (SiC).

Advantageously, the thermostructural composite material forming the support structure of the heat exchanger is a C/C composite material. It can be in the form of a honeycomb or of a composite material in which the fiber reinforcement is formed by superposed layers of fibers bonded together by fibers extending transversely relative to the layers, as can be obtained by needling, e.g. as described in patent U.S. Pat. No. 4,790,052.

Also advantageously, the material of the intermediate portion is also a C/C composite material which is then used more for its refractory qualities than for its structural qualities.

It is possible to envisage making the portion that forms the support structure and the intermediate portion as a single block of C/C composite material to which the portion forming the heat shield is brazed.

Also advantageously, the material of the portion forming the heat shield is a material of the CMC type, e.g a C/SiC or SiC/SiC composite material (i.e. a material having reinforcing fibers of carbon or of silicon carbide and densified by a silicon carbide matrix), which materials are more suitable than C/C composite materials for exposure to intense heat flux, particularly in an oxidizing atmosphere. An advantage of the heat exchanger of the invention lies in the possibility of selecting materials that are the most suitable for performing the thermal functions and for performing the mechanical functions of the heat exchanger, thereby making it possible to optimize manufacture of the heat exchanger in terms of performance and bulk.

According to yet another feature of the heat exchanger of the invention, the fluid circulation channels are formed in one face of the intermediate portion, e.g. by machining, and they are defined in part by the adjacent wall of one of the other two portions. The fluid circulation channels are thus particularly simple to make.

If necessary, the channels can be made leakproof by forming a coating on their walls, e.g. a thin layer of metal coating. Such a coating can be formed over the entire facing faces of the portions that are to be assembled together so as to facilitate brazing, thereby also constituting an adhesion layer for brazing purposes.

BRIEF DESCRIPTION OF THE DRAWINGS

Reference is made below to the accompanying drawings, in which.

DETAILED DESCRIPTION OF PREFERRED EMBODIMENTS

Figure 1:
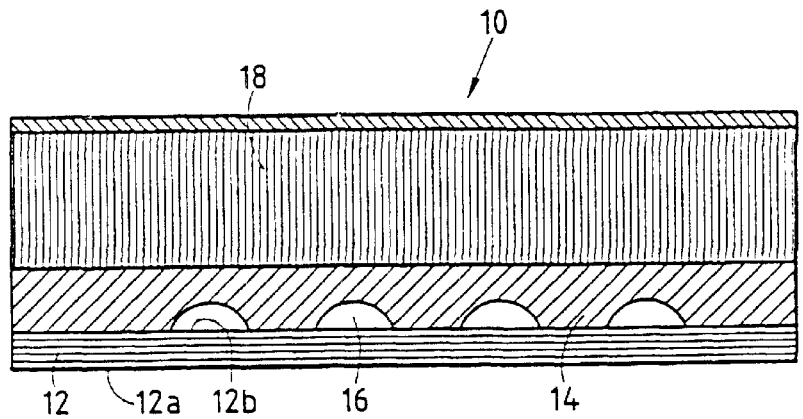
FIG. 1 is a section through a heat exchanger element constituting a first embodiment of the invention.

FIG. 1 is a section view of a unitary block 10 constituting a heat exchanger element. The block 10 can constitute a wall element of an enclosure in which severe thermal conditions exist, e.g. a wall element of a plasma confinement chamber in a nuclear fusion reactor.

The heat exchanger block 10 comprises a heat shield 12 whose outer face 12a is to be exposed to a heat flux, an intermediate portion 14 having fluid circulation channels 16, and a support structure 18. The intermediate portion is interposed between the heat shield 12 and the support structure 18 and it is bonded thereto by brazing. The fluid circulation channels 16 are machined in the face of the intermediate portion that is situated adjacent to the heat shield 12 and that is covered by the inner face 12b of the heat shield, which inner face 12b thus defines the channels 16 in part. The channels 16 are for connection to a circuit for circulating a cooling fluid.

The heat shield 12 which is exposed to the most severe temperature conditions is made of a refractory composite material, preferably a ceramic matrix composite (CMC) material, e.g. a composite material of the C/SiC type, i.e. having carbon fiber reinforcement densified with a matrix of silicon carbide.

The intermediate portion is also made of a refractory composite material, e.g. a C/C composite material having carbon fiber reinforcement densified by a carbon matrix.

The support structure is made of a thermostructural composite material and is designed to provide the structural function of the block 10. For example, a support structure can be used in the form of a honeycomb structure of C/C composite material. A method of manufacturing such a structure is described in patent U.S. Pat. No. 5,415,715. It is also possible to use a support structure in the form of a C/C composite material in which the fiber reinforcement is made up of plane layers of fiber fabric bonded together by fibers extending trarsversely relative to the layers. By way of example, the layers can be layers of woven cloth, unidirectional sheets superposed in different directions, layers of felt, ..., and they are preferably bonded together by needling. A method of manufacturing such a C/C composite material is described in patent U.S. Pat. No. 4,790,052.

Figure 2:
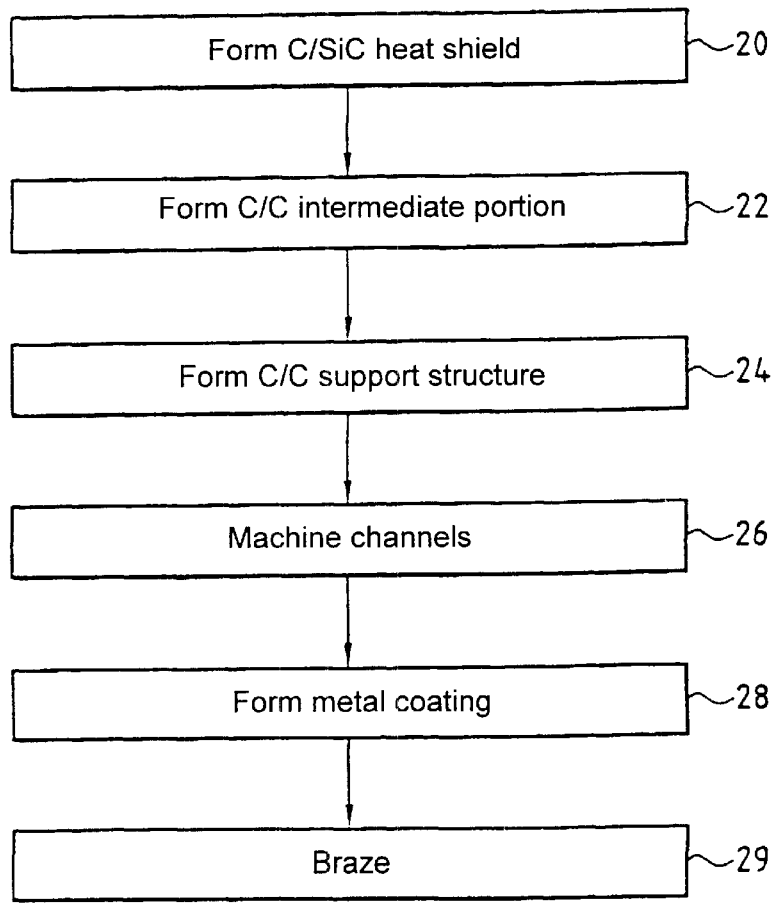
FIG. 2 shows the steps in a method of making the heat exchanger element of FIG. 1.

FIG. 2 gives the steps in a method of manufacturing the exchanger block 10.

The CMC material heat shield, e.g. made of C/SiC composite material, the intermediate portion of C/C composite material, and the support structure of C/C composite material are all made separately (steps 20, 22, 24). Methods of manufacturing pieces out of composite material of the C/C or C/SiC type by preparing a fiber reinforcement or preform, and then densifying the fiber reinforcement with a matrix are well known. Densification can be performed by chemical vapor infiltration or by impregnation using a precursor of the matrix in the liquid state and transforming the precursor by heat treatment.

The channels 16 are machined in one of the faces of the intermediate portion 14 (step 26).

Thereafter, a metal coating can be formed over the facing faces of the intermediate portion, of the heat shield, and of the support structure in their entirety (step 28). The metal coating is selected to improve wettability for the brazing alloy that is used subsequently for assembling the various portions together, and thus to improve adhesion of the brazing alloy. The metal coating also serves to leakproof the walls of the fluid circulation channels. C/C composite materials or CMC materials obtained as mentioned above inevitably present residual porosity and that needs to be closed on the surface in order to ensure that the channels are leakproof.

The metal coating, e.g. of titanium, chromium, zirconium, hafnium, or beryllium can be deposited by chemical vapor deposition or by vacuum sputtering.

In the event of it being unnecessary to have a metal coating for adhesion of the brazing alloy, it is still necessary to leakproof the walls of the channels 16. Such leakproofing can then be performed by depositing a sealing layer at least on the machined portions of the intermediate portion and on the facing portions of the adjacent face of the heat shield. The sealing layer can be deposited by chemical vapor deposition. It can be metallic or non-metallic, e.g. it can be carbon or ceramic.

Brazing (step 29) is performed by depositing a layer of brazing alloy on the faces for assembly of the intermediate portion, of the heat shield, and of the support structure, by holding the assembly together in tooling, and by raising its temperature to the brazing temperature appropriate for the brazing alloy used. The alloy used is selected from those known for brazing ceramics or refractory compositions to one another or to metals, e.g. the alloys sold under the name "TiCuSil" or "Cu-ABA" by the US company Wesgo, Inc. Reference can be made to above-mentioned patent application WO 98/03297, and to an article by A. G. Foley and D. J. Andrews, "Active metal brazing for joining ceramics to metals", GEC Alsthom Technical Review, No. 13, February 1994, France, pp. 49–64.

Figure 3:
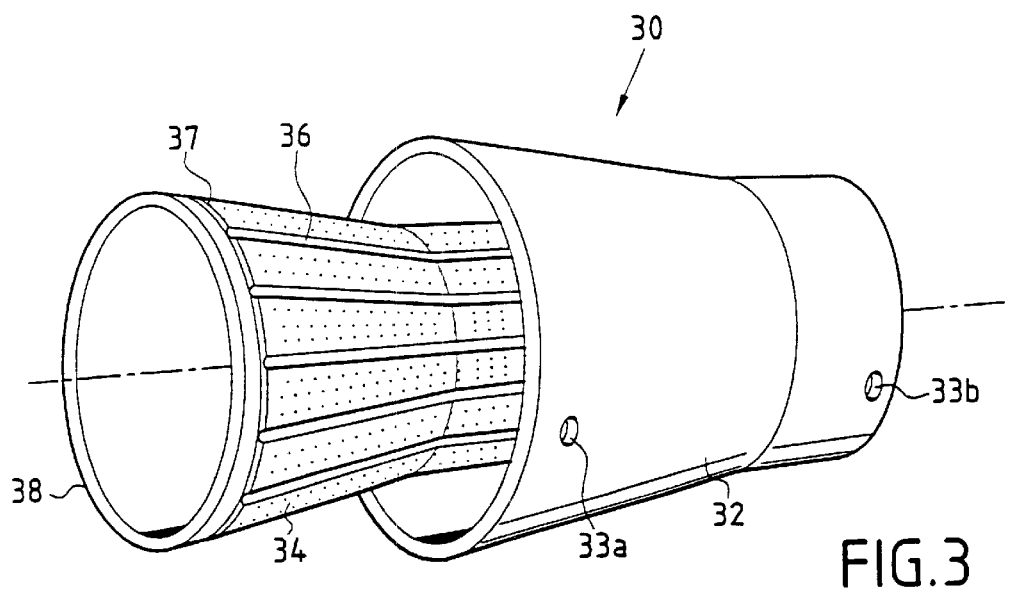
FIG. 3 is an exploded view of a jet engine combustion chamber element forming a heat exchanger that constitutes a second embodiment of the invention.

FIG. 3 is an exploded view of another embodiment of a heat exchanger of the invention constituting an element 30 of a jet engine combustion chamber. The heat shield 32 is an axially symmetrical annular piece having a cylindrical front portion extended rearwardly by a frustoconical portion. The heat shield 32 is made as a single piece of CMC composite material, e.g. of C/SiC composite material. The fiber reinforcement of the composite material is made by winding a fiber fabric onto a mandrel of appropriate shape, and the resulting preform is densified by the matrix of the composite material.

The fluid circulation channels 36 are formed in the axial direction by machining the face of an intermediate portion 34 that is situated facing the heat shield 32. The intermediate portion 34 is made of a C/C composite material. The cooling fluid is a fuel which is heated by passing through the heat exchanger prior to being injected into the combustion chamber. Fluid admission and outlet orifices 33a and 33b are formed through the shied 32 in the vicinity of its axial ends, and level with grooves such as 37 that are machined circumferentially at the front and at the rear of the intermediate portion so as to constitute manifolds for distributing the fluid to the channels 36 at one end and for collecting it from the channels at the other end.

The intermediate portion 34 is secured to a support structure 38 in the form of an annular structure of C/C composite material. It is formed by winding superposed layers of a fiber fabric onto a mandrel and by bonding the layers together by fibers that extend transversely relative to the layers, e.g. by needling, with the resulting annular preform being densified with a carbon matrix. A method of making needled annular preforms to constitute reinforcement in structural parts made of C/C composite material is described in above-mentioned patent U.S. Pat. No. 4,790,052.

The support structure 38 and the intermediate portion can be made as two parts which are assembled together by brazing, or they can be made as a single part as in the example shown.

The heat shield 32 is brazed to the face of the intermediate portion that presents the channels 36 and the grooves 37.

Brazing is performed as described above with reference to FIGS. 1 and 2, possibly after forming a coating of metal to which the brazing alloy adheres, and at least after forming a sealing coating on the walls of the channels 36 and the grooves 37.

Figure 4:
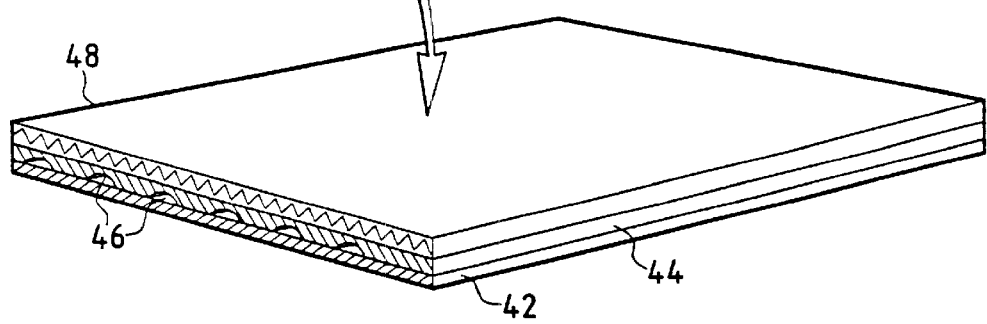
FIG. 4 shows in highly diagrammatic manner a ram jet chamber with a detail view showing a wall element of the combustion chamber forming a heat exchanger constituting a third embodiment of the invention.

FIG. 4 is highly diagrammatic and shows a ram jet structure having a wall 40 that constitutes a heat exchanger of the invention.

The wall 40 is analogous in structure to the block 10 of FIG. 1 and it is manufactured in similar manner. The heat shield 42 situated on the inside of the wall is made of CMC material, e.g. of C/SiC. It is brazed to an intermediate portion 44 via a face having channels 46 machined therein, the face of the intermediate portion 44 having the channels being covered by the heat shield 42. The channels 46 carry a fluid constituting a fuel that is injected into the combustion chamber after being heated by passing through the wall 40.

The intermediate portion 44 is made of C/C composite material and it is brazed to a support structure 48 likewise made of C/C composite material. The support structure is advantageously in the form of a honeycomb so as to make the assembly as light as possible.

The brazing, the optional formation of a metal coating for adhesion on the faces that are to be brazed together, and the formation of a sealing coating on the walls of the fluid circulation channels are all performed as described with reference to FIGS. 1 and 2.

Above, it is assumed that the fluid circulation channels are formed in that face of the intermediate portion which is situated adjacent to the heat shield. That is a preferred disposition. Nevertheless, the channels could be formed in that face of the intermediate portion which is situated adjacent to the support structure.

What is claimed is:

1. A heat exchanger of composite material, characterized in that it comprises an intermediate portion of refractory composite material in which fluid circulation channels are formed, the intermediate portion being interposed between a portion of refractory composite material forming a heat shield and a portion of thermostructural composite material forming a support structure of the heat exchanger, the portions constituting the heat exchanger being assembled together by brazing.

2. A heat exchanger according to claim 1, characterized in that the intermediate portion is of C/C composite material.

3. A heat exchanger according to claim 1, characterized in that the portion forming a heat shield is of ceramic matrix composite material.

4. A heat exchanger according to claim 3, characterized in that the portion forming a heat shield is of C/SiC composite material.

5. A heat exchanger according to claim 1, characterized in that the portion forming a support structure is of C/C composite material.

6. A heat exchanger according to of claim 1, characterized in that the fluid circulation channels are formed in one face of the intermediate portion and are defined in part by the adjacent wall of one of the other two portions.

7. A heat exchanger according to claim 1, characterized in that the fluid circulation channels are provided with a leakproof coating.

8. A heat exchanger according to claim 1, characterized in that the portion forming a support structure is of honeycomb structure.

9. A heat exchanger according to claim 1, characterized in that the portion forming a support structure is of a composite material comprising fiber reinforcement having a plurality of superposed fiber layers bonded together by fibers extending transversely relative to the layers.

10. A combustion chamber wall element for a ram jet, characterized in that it incorporates a heat exchanger in accordance with claim 1.

11. A method of manufacturing a heat exchanger of composite material, the method being characterized in that it comprises:

making an intermediate portion of refractory composite material provided with fluid circulation channels;

making a heat shield portion of refractory composite material;

making a structural portion out of thermostructural composite material; and assembling the various portions together by brazing with the intermediate portion being interposed between the heat shield portion and the structural portion.

12. A method according to claim 11, characterized in that the fluid circulation channels are formed by machining in a face of the intermediate portion.

13. A method according to claim 11, characterized in that the intermediate portion is made of C/C composite material.

14. A method according to claim 11, characterized in that a leakproof coating is formed on the walls of the fluid circulation channels.

15. A method according to claim 14, characterized in that the leakproof coating is formed by depositing a layer of metal.

16. A method according to claim 11, characterized in that the heat shield portion is made of ceramic matrix composite material.

17. A method according to claim 11, characterized in that the structural portion is made of C/C composite material.

18. A method according to claim 11, characterized in that a honeycomb structure portion is made.

19. A method according to claim 11, characterized in that the structural portion is made of a composite material having fiber reinforcement densified by a matrix, and in that the fiber reinforcement is made by superposing a plurality of fiber layers and needling them together.

20. A method according to claim 11, characterized in that a brazing alloy adhesion layer of metal is formed on the facing faces of the portions that are to be assembled together by brazing.

21. A method according to claim 20, characterized in that the fluid circulation channels are formed by machining in a face of the intermediate portion which is covered by an adjacent face of another portion, and the metal layer is formed on the face of the intermediate portion, after the channels have been machined, and on the adjacent face, in such a manner that the metal layer also constitutes a coating for leakproofing the walls of the fluid circulation channels.

22. A heat exchanger according to claim 2, characterized in that:

the portion forming a heat shield is of ceramic matrix composite material;

the portion forming a heat shield is of C/SiC composite material;

the portion forming a support structure is of C/C composite material;

the fluid circulation channels are formed in one face of the intermediate portion and are defined in part by the adjacent wall of one of the other two portions;

the fluid circulation channels are provided with a leakproof coating;

the portion forming a support structure is one of honeycomb structure; and a composite material comprising fiber reinforcement having a plurality of superposed fiber layers bonded together by fibers extending transversely relative to the layers.

23. A method according to claim 12, characterized in that:

the intermediate portion is made of C/C composite material;

a leakproof coating is formed on the walls of the fluid circulation channels depositing a layer of metal;

the heat shield portion is made of ceramic matrix composite material;

the structural portion is made of C/C composite material;

one of a honeycomb structure portion and a composite material having fiber reinforcement densified by a matrix, with the fiber reinforcement made by superposing a plurality of fiber layers and needling them together is made;

a brazing alloy adhesion layer of metal is formed on the facing faces of the portions that are to be assembled together by brazing; and the fluid circulation channels are formed by machining in a face of the intermediate portion which is covered by an adjacent face of another portion, and the metal layer is formed on the face of the intermediate portion, after the channels have been machined, and on the adjacent face, in such a manner that the metal layer also constitutes a coating for leakproofing the walls of the fluid circulation channels.

* * * * *

UNITED STATES PATENT AND TRADEMARK OFFICE
CERTIFICATE OF CORRECTION

PATENT NO.     : 6,397,581 B1
DATED          : June 4, 2002
INVENTOR(S)    : Jean-Pierre Vidal et al.

It is certified that error appears in the above-identified patent and that said Letters Patent is hereby corrected as shown below:

Column 1,
Line 30, "98,/03297" should read -- 98/03297 --; and

Column 5,
Line 53, "to of" should read -- to --.

Signed and Sealed this

Twenty-ninth Day of July, 2003

JAMES E. ROGAN
*Director of the United States Patent and Trademark Office*